US009762172B2

(12) United States Patent
Lelkes

(10) Patent No.: US 9,762,172 B2
(45) Date of Patent: Sep. 12, 2017

(54) CONVERTER

(71) Applicant: BAUMUELLER NUERNBERG GMBH, Nuremberg (DE)

(72) Inventor: Andras Lelkes, Nuremberg (DE)

(73) Assignee: Baumueller Nuernberg GmbH, Nuremberg (DE)

( * ) Notice: Subject to any disclaimer, the term of this patent is extended or adjusted under 35 U.S.C. 154(b) by 0 days.

(21) Appl. No.: 14/968,047

(22) Filed: Dec. 14, 2015

(65) Prior Publication Data
US 2016/0173021 A1    Jun. 16, 2016

(30) Foreign Application Priority Data

Dec. 13, 2014 (DE) .................. 10 2014 018 665

(51) Int. Cl.
| G01R 31/02 | (2006.01) |
| H02P 27/06 | (2006.01) |
| H02M 1/32 | (2007.01) |
| H02M 7/00 | (2006.01) |
| H02M 7/5387 | (2007.01) |
| H02P 29/02 | (2016.01) |

(52) U.S. Cl.
CPC .............. H02P 27/06 (2013.01); H02M 1/32 (2013.01); H02M 7/003 (2013.01); H02M 7/53871 (2013.01); H02P 29/02 (2013.01); H02M 2001/327 (2013.01)

(58) Field of Classification Search
CPC . G05B 2219/24008; G05B 9/02; H02M 1/32; H02M 2001/327; H02P 27/06; H02P 29/02; H02H 7/0844
See application file for complete search history.

(56) References Cited

U.S. PATENT DOCUMENTS

| 7,710,064 | B2 | 5/2010 | Sakurai et al. |
| 2003/0072117 | A1 | 4/2003 | Maekawa et al. |
| 2013/0342262 | A1* | 12/2013 | Konstantinov .... H03K 17/0414 327/375 |
| 2014/0009896 | A1 | 1/2014 | Nikola et al. |

FOREIGN PATENT DOCUMENTS

| AT | 504199 A1 | 3/2008 |
| DE | 20203595 U1 | 5/2002 |
| DE | 102011015327 A1 | 10/2012 |
| EP | 1860767 A2 | 11/2007 |
| JP | 08033055 A | 2/1996 |
| JP | 2008011608 A | 1/2008 |
| WO | 2008028205 A1 | 3/2008 |

* cited by examiner

Primary Examiner — Karen Masih
(74) Attorney, Agent, or Firm — Laurence A. Greenberg; Werner H. Sterner; Ralph E. Locher

(57) ABSTRACT

A converter has a control element with a motion control function and a power element with a power semiconductor switch. The power element is provided with a safety control circuit that provides for a safety function.

13 Claims, 2 Drawing Sheets

CONVERTER

CROSS-REFERENCE TO RELATED APPLICATION

This application claims the priority, under 35 U.S.C. §119, of German application DE 10 2014 018 665.2, filed Dec. 13, 2014; the prior application is herewith incorporated by reference in its entirety.

BACKGROUND OF THE INVENTION

Field of the Invention

The invention relates to an electrical converter with a control element comprising a motion control function and a power element with a power semiconductor switch.

Industrial installations are customarily provided with a plurality of rotating electric machines, by way of which, for example, machine tools or conveyor belts are driven. The electric energy required for this purpose is delivered by converters, which comprise a control element and a power element respectively. The control element, for signaling purposes, is connected to a process control circuit and is provided with a speed control function. Rotational speed signals transmitted to the control element of the relevant electric machine are evaluated, and the electric energy delivered is adjusted, in order to achieve a specific setpoint speed of rotation. To this end, the control element is provided with an electronic circuit, which operates at a comparatively low power rating.

Electric energy for the electric machine itself is delivered by the power element, which customarily comprises a power semiconductor switch. By means of the semiconductor switch, an electric current flow from a power supply grid is adapted to the electric machine. The power semiconductor switch is controlled by the control element such that the speed of rotation of the electric machine corresponds to the setpoint speed of rotation dictated by the control circuit. Electric voltages switched by means of the semiconductor switch are customarily in excess of 800 volts. Electric currents switched have a current rating in excess of 1 amp or 10 amps, thereby dictating more stringent requirements for the electrical insulation of the power element.

In order to preclude the injury of service personnel of the electric machine, or to reduce the consequences thereof, "emergency stop" switches, for example, are known. In the event of an unauthorized or unintentional presence of a person in the vicinity of the electric machine, the switch is actuated manually, such that an operation of the electric machine is interrupted virtually immediately. To this end, the switch is generally coupled, for signaling purposes, to the process control circuit. Upon the actuation of the switch, the process control circuit transmits a signal to the control element, as a result of which the current supply to the electric machine is interrupted. To this end, the power semiconductor switch is generally switched to an electrically non-conducting state. It is therefore necessary for the signal transmitted to the control element, or else the control element itself, to be adjusted on the relevant power semiconductor switch. In the event of a replacement of the converter or any components thereof, for example the power semiconductor switch or the complete power element, it is therefore necessary for the signal, or the functions of the control element actuated thereby, to be adjusted in each case.

SUMMARY OF THE INVENTION

It is accordingly an object of the invention to provide a converter which overcomes the above-mentioned and other disadvantages of the heretofore-known devices and methods of this general type and of the invention, in which safety is appropriately enhanced and the replacement of which is advantageously simplified.

With the foregoing and other objects in view there is provided, in accordance with the invention, a converter, comprising:

a control element having a motion control function;

a power element having a power semiconductor switch; and said power element having a safety control circuit configured to provide a safety function.

In other words, the novel converter comprises a control element and a power element which are accommodated, for example within the same housing. However, it is specifically preferred that the control element should be provided with a first housing and the power element should be provided with a second housing, within which the respective further components of the respective element are accommodated. In other words, the respective housings constitute the demarcations of the control and power elements, wherein the two housings are separated from each other. In other words, the converter comprises two housings, and the first housing is not the same as the second housing. The first housing, for example, is fitted to the second housing and specifically is secure thereto. In other words, the first housing is in direct mechanical contact with the second housing. Alternatively, a clearance may be arranged between the first housing and the second housing. In other words, the control element is arranged at a distance from the power element. Preferably, both the first housing and the second housing are connected to ground, which firstly reduces electromagnetic wave pollution in the vicinity of the converter. By this arrangement, the impact of environmental influences upon the operation of the control element and the power element is also reduced.

The control element comprises a motion control function. The motion control function is executed, for example, by means of an electric or electronic circuit. Electric currents required for the circuit are appropriately equal to or lower than 1 A, 0.5 A, 0.2 A, 0.1 A, 50 mA, 20 mA, 10 mA or 5 mA. Specifically, the electric current required for operation is greater than 1 mA, 5 mA, 10 mA or 50 mA. For example, the maximum electric voltage associated with the motion control function is equal to or lower than 100 V, 50 V, 25 V, 10 V or 5 V. Specifically, the electric voltage is greater than 1 V, 2 V or 8 V. For example, the control element is provided with a transformer for this purpose, by means of which electric energy is adjusted to the requisite values. Specifically, the transformer is arranged within the first housing, if this is present. Appropriately, the potential difference of the motion control function in relation to the first housing, where present, is a maximum of 400 V, 200 V, 100 V, 50 V, 24 V, 12 V, 6 V, 5 V or 2 V. By this arrangement, the electrical insulation of the motion control function in relation to the first housing can be achieved in a relatively cost-effective manner.

The power element comprises a power semiconductor switch, which is specifically a component of a power circuit. The power circuit supplies the electric energy required for the propulsion of an electric machine in service. Specifically, by means of the power semiconductor switch (semiconductor switch), the electric energy output of the converter is adjusted. For example, the converter is provided with an output, which is appropriately configured as a connecting terminal. In the assembled condition, the connecting terminal provides an electrical connection to an electric machine (electric motor) for example by means of a conductor, such as a cable. Accordingly, electric energy flows from the converter to the electric machine via the connecting terminal and the conductor. For example, the power switch is connected in series with the connecting terminal, such that the electric current flow is adjusted by means of the power semiconductor switch. The power semiconductor switch appropriately incorporates a free-wheeling diode, or a free-wheeling diode is connected in parallel with the power semiconductor switch. Specifically, the converter is provided with two or three outputs, and with four or six power semiconductor switches. The power semiconductor switches are appropriately arranged in mutual electrical contact with each other and with the outputs in a bridge circuit. In other words, the power element comprises a B4 or B6 circuit. The power semiconductor switches specifically constitute an inverter side of the converter. However, the power semiconductor switches are at least a component of the inverter side of the power element. The power element appropriately comprises an intermediate circuit, preferably with an intermediate circuit capacitor. The intermediate circuit is appropriately supplied by a rectifier side of the power element, which is specifically configured in the form of diodes or further semiconductor switches. For example, the converter may be configured in the form of a 2-level or 3-level converter. In other words, the intermediate circuit incorporates two or three different electrical potential levels.

The power semiconductor switch, by way of example, is a field effect transistor, a MOSFET, an IGBT, a GTO or a thyristor, such as in particular, for example, an IGCT. The power element is appropriately provided with a cooling function of the power semiconductor switch. The cooling function is, for example, a passive structural element, such as a heat sink with a plurality of cooling ribs, for example. The power semiconductor switch may be cooled by means of a fluid, such as e.g. oil or water, whereby the power semiconductor switch, for example, is arranged in oil, or is in thermal contact with a line which conveys the coolant fluid.

The power element is also provided with a safety control circuit, which comprises a safety function. By means of the safety control circuit, operation is monitored, specifically the presence of a safety-critical signal. A signal of this type is transmitted from a control circuit to the converter, for example, for signaling purposes. For example, the safety control circuit is connected, for signaling purposes, to an "emergency stop" switch. The safety control circuit is provided and configured, as an alternative thereto or in combination therewith, to record operating data from the converter, or at least to evaluate the latter. In particular, all operating data which are identified within the power element, i.e. which are recorded and/or processed within the power element, are considered for this purpose. In other words, the safety control circuit is coupled to the sensors of the power element, for signaling purposes. This enables a comparatively time-saving processing of operating data. In other words, the time interval between the recording of operating data and the processing thereof by the safety control circuit is relatively short. For example, all operating data, or only a specific proportion of said operating data are taken into consideration. Alternatively, further operating data may be routed to the safety control circuit, which is recorded, for example, by the motion control function. Operating data, for example, are measured data recorded by means of a sensor and/or data derived from said measured data.

Where a safety-critical signal is recorded by the safety control circuit, or a safety-critical state of the converter is detected by reference to operating data, i.e. the safety-critical signal itself is generated on the basis of operating data, the safety function will be executed. The safety function appropriately controls the power semiconductor switch, or influences a control of the semiconductor switch. To this end, the influence or control is such that any electric machine which is connected to the converter is brought into a safe condition. Specifically, by means of the safety function, any other control of the power semiconductor switch is overridden. By means of the safety function, any other control of the power semiconductor switch is appropriately cancelled.

In this way, it is possible for the converter to assume a modular structure, whereby both the control element and the power element may be replaced substantially independently of each other. Moreover, no comparatively complex adjustment of the respective remaining element to the replaced element, i.e. the inoperative power element or the replaced control element, is required. Specifically, the control element and the power element, for signaling purposes, are interconnected by means of a standardized interface, such that replacement is further facilitated. Consequently it is possible, in the case of an existing converter, to replace the power element with a power element which is provided with a modified power semiconductor switch, whereby the safety function of the converter will already be adapted to said modified power semiconductor switch. Accordingly, no comparatively complex adjustment of the control element is required.

For example, all the safety-critical functions of the converter are integrated in the safety control circuit of the power element. In other words, the control element incorporates no further safety functions. By this arrangement, it is possible to produce a comparatively cost-effective control element such that, upon the replacement of the power element, there is no necessity for the re-evaluation of the control element in respect of its safety functions, which would generate increased costs on the grounds of the certification required for this purpose. Specifically, the control element incorporates no hardware functions, and is consequently independent of the physical hardware configuration of the power element, thereby facilitating the further modularization of the converter.

For example, the power semiconductor switch may be bonded to a punch grid, with which it is in electrical contact. For example, the punch grid may be enclosed in plastic, thereby preventing any electrical short-circuit. By this arrangement, it is possible to produce a comparatively cost-effective power element, whereby the maximum electric current which is conductible via the punch grid is comparatively high, such that even electric machines of a comparatively high power rating can be operated using the converter. Alternatively, the power element comprises a first printed circuit board, whereby the power semiconductor switch is a component of said first printed circuit board. The first printed circuit board comprises a printed board, to which the power semiconductor switch is attached. Specifically, the power semiconductor switch is soldered to the printed board of the first printed circuit board. The printed board is preferably provided with copper printed conductors, at least one of which is arranged in electrical contact with the power semiconductor switch. The printed conductors of the printed board are specifically secured to a glass fiber-reinforced epoxy resin base. Alternatively, the printed board is configured as a flexible printed board. The printed board simplifies the control and assembly of the power semiconductor switch, such that the power element is comparatively robust. The first printed circuit board is appropriately provided with further electronic or electric components, which are secured to the printed board and are preferably in electrical contact with the latter. For example, the first printed circuit board comprises the intermediate circuit capacitor, where fitted, further capacitors and/or resistors, by means of which, for example, an intermediate circuit voltage is stabilized and/or generated, for application to the opposing electrodes of the intermediate circuit capacitor. Preferably, the bridge circuit is formed by the first printed circuit board, if the power element comprises four or more power semiconductor switches.

For example, the first printed circuit board carries the safety control circuit. The safety control circuit is comprised, for example, of discrete electric and/or electronic components, which are contacted with each other by means of a printed conductor of the printed board of the first printed circuit board. Alternatively, the safety control circuit is configured as an integrated circuit. In other words, the integrated circuit comprises the safety control circuit. For example, the integrated circuit, and consequently the integrated circuit, is an application-specific integrated circuit (ASIC), an application-specific standard product (ASSP) or a programmable integrated circuit. By this arrangement, a subsequent adjustment or extension of the safety control circuit to incorporate additional functions is possible. The safety control circuit is preferably configured as a microprocessor, specifically of the programmable type.

In a particularly preferred alternative, the safety control circuit incorporates a second printed circuit board and, in a particularly preferred arrangement, is specifically comprised of the latter. In consequence, the safety function is provided by the second printed circuit board, for example by means of an integrated circuit of the second printed circuit board, which may be configured for example as an ASIC or as a programmable integrated circuit, specifically as a microchip or microprocessor. Specifically, the monitoring of a safety-critical signal or the evaluation of operating data from the converter is executed by means of the second printed circuit board. The second printed circuit board is coupled to the first printed circuit board, for signaling purposes, such that an exchange of signals between the first and the second printed circuit board is possible. The second printed circuit board is attached to the first printed circuit board, thereby producing a comparatively robust power element. Due to the second printed circuit board, the further modularization of the converter is possible. Specifically, it is possible to construct the safety control circuit independently of the first printed circuit board, or to employ a comparatively cost-effective printed board for the second printed circuit board, on the grounds that the latter is only required to carry relatively low electric currents. Specifically, the second printed circuit board is accommodated in a housing which is bonded to the first printed circuit board.

For example, the second printed circuit board is soldered to the first printed circuit board, thereby producing a relatively stable bond between the two printed circuit boards, such that an exchange of signals between the two printed boards, even in the event of the agitation of the power element resulting, for example, from the vibration of the driven electric machine, is essentially not associated with any impairment of the operation of the power element. Appropriately, however, the second printed circuit board is bonded to the first printed circuit board by means of a plug-in connection. Preferably, the second printed circuit board is plugged into a plug-in connector of the first printed circuit board. It is specifically preferred that the second printed circuit board should be configured in the form of a plug-in card. By this arrangement, it is possible to undertake the retrofitting of the converter and the adaptation thereof to current requirements, wherein the second printed circuit board is replaced by a second printed circuit board with extended functions. In other words, the existing second printed circuit board is replaced by a further second printed circuit board, the safety function of which differs from that of the original second printed circuit board, or which is provided with an additional safety function.

Appropriately, only safety-related data are transmitted between the first and second printed circuit boards during operation. This reduces both the volume of data and the frequency of errors. However, it is preferred that additional serial numbers or a safety level should be transmitted between the first and second printed circuit boards, whereby the safety level corresponds to a specific minimum safety function which can be executed by means of the second printed circuit board. Alternatively, or in combination thereto, a parametric data set is transmitted, at least upon the initial installation of the second printed circuit board. By means of the parametric data set, the safety function and/or further components of the safety control circuit may be appropriately parameterized and adapted to the power semiconductor switch.

For example, operation may be thermally and/or electrically monitored by means of the safety control circuit of the power semiconductor switch, further components of the converter, or the electric machine which is powered by the converter. To this end, specifically, appropriate operating data from the converter and/or the electric machine are evaluated by means of the safety control circuit. Operating data of this type include, for the example, the actuation of an "emergency stop" switch or the opening of a door or an access panel on the electric machine, or the interruption of a photoelectric barrier upon entry to the proximity of the electric machine or the converter. For example, the temperature of the electric machine, for example of the rotor and/or the stator, or any windings of the electric machine are monitored by the safety control circuit. In the event of an overrun of a limiting value of the assumption of a specific value by the relevant operating data, the execution of the safety function proceeds.

The safety function, for example, is a safe limited speed function (SLS), involving the limitation of the speed of rotation of the electric machine which is driven by the converter, such that the maintenance of the electric machine and the setting of the electric machine are facilitated, and whereby any injury to the person responsible for the execution thereof is substantially precluded by the reduced speed. Alternatively, the safety function is a safe torque off function (STO). To this end, appropriately, a control function of the power semiconductor switch is interrupted, and the latter is brought to an electrically non-conducting condition. Consequently, upon the execution of the safety function, the power supply is interrupted, essentially without delay. If, at the time of tripping of the safety function, the electric machine is in service, the latter is consequently brought to an uncontrolled stop, whereby no torque is generated. By this arrangement, protection is also provided against a spurious start-up. Alternatively, the safety function is a safe operating stop function (SOS), by the execution of which it is ensured that the electric machine does not depart from a defined positional window. Specifically, it is ensured that the rotor can only assume a specific angular position in relation to the stator, in addition to a predetermined deviation.

In further embodiments, the safety function is a safe stop 1 function (SS1) or a safe stop 2 function (SS2), by means of which the electric machine is brought to a controlled stop and the semiconductor switch is then switched over to an electrically non-conducting state, or the control function remains active. Appropriately, the safety control circuit incorporates two or more of these safety functions, thereby producing a converter with comparatively superior operational security. If the safety control circuit is executed on the second printed circuit board, the first printed circuit board is to be appropriately configured and is provided to be coupled with mutually differing safety control circuits, for signaling purposes. To this end, safety control circuits are appropriately distinguished by the type and number of associated safety functions. Preferably, the second printed circuit board is attached to the first printed circuit board by means of a connector, thereby facilitating a replacement of the second printed circuit board and, in consequence, a retrofitting of the converter to incorporate specific safety functions.

For example, the safety control circuit incorporates a diagnostic function, by means of which a safety control of the semiconductor switch, or of further components of the power element, are appropriately executed. If the safety control circuit is executed on the second printed circuit board, a diagnosis of the first printed circuit board may be appropriately executed by means of the diagnostic function. Alternatively, or in combination thereto, the diagnostic function monitors the correct execution of the safety function and/or further components of the safety control circuit. Appropriately, the diagnostic function is executed upon the initial entry into service of the safety control circuit and/or of the power element. For example, the diagnostic function may be executed on a cyclical basis, specifically every 2, 3, 5, 7, 10 or 14 days. Appropriately, the diagnostic function is executed after the execution of the safety function and/or after the switchover of the converter to an operating mode from a standby mode, or in standby mode. By this arrangement, the consistently correct operation of the converter, and specifically of the safety control circuit, can consequently be confirmed.

For example, the power element is provided with a current control function, by means of which the electric current flowing from the converter to the electric machine is controlled, dependent on an external parameter, which is dictated by the control element. In other words, the current control function is subordinate to the motion control function. By this arrangement, it is not necessary for the motion control function or further components of the control element to be adapted to the physical configuration of the power semiconductor switch or to the interconnection thereof, as the control function which is specific to the power semiconductor switch is executed by the power element itself. Appropriately, the power element is provided with a driver circuit, by means of which the power semiconductor is controlled. In other words, the base or the gate of the power semiconductor switch is actuated by means of the driver circuit, provided that the semiconductor switch incorporates a connection of this type. Specifically, the current control function and the driver circuit are configured in the form of a pulse-width modulator, by means of which the gate of the semiconductor switch is preferably controlled. However, the semiconductor switch is at least controlled by signals from the pulse-width modulator. Appropriately, the current control function, the driver circuit or the pulse-width modulator are configured in the form of a circuit on the first printed circuit board, where said first printed circuit board is present. A replacement of the power semiconductor switch is simplified accordingly, as only the first printed circuit board must be removed and replaced with a new printed circuit board. A comparatively complex setting or wiring operation is not required. If the safety control circuit is executed on the second printed circuit board, the latter can consequently remain in use when the first printed circuit board is replaced, thereby saving costs.

Appropriately, the power element comprises an electric voltage recording function and/or an electric current recording function. Monitoring is applied specifically to the terminal of the power element which can receive electrical energy from the semiconductor switch, to which the electric machine is connected in service. For example, an electric voltage occurring via the power semiconductor switch and/or an electric current flowing through the power semiconductor switch are recorded. In other words, the power element records such operating data as are influenced by the power element itself. Preferably, all operating data of this type are recorded. Alternatively or, in a specifically preferred arrangement, in combination thereto, the power element comprises a temperature recording function, by means of which the temperature of the semiconductor switch and/or of further components of the power element, including e.g. the second housing thereof, are appropriately monitored. Temperature recording function is appropriately executed by means of a circuit on the first printed circuit board. Preferably, all operating data recorded by means of the power element are made available to the safety control circuit. By this arrangement, a comparatively short signal path is achieved between the determination of operating data and the processing thereof by the safety control circuit, thereby reducing the frequency of errors. For example, the safety control circuit is supplied with additional operating data, specifically a speed of rotation and/or positional data for the rotor concerned, which have not been determined by components of the power element. Specifically, these operating data are verified by the diagnostic function, where present, with the assistance of operating data determined by the power element, thereby enhancing safety.

Preferably, the motion control function comprises an encoder evaluation function which, in the assembled condition, is appropriately coupled, for signaling purposes, to an encoder of the electric machine. The speed of rotation of the electric machine is determined by means of the encoder. Accordingly, the encoder evaluation function produces operating data which correspond to the actual speed of rotation of the electric machine. In consequence, an essentially instantaneous adjustment of the motion of the electric machine can be achieved by means of the converter, in the event of a deviation between the actual values determined by the encoder evaluation function and the stipulated notional values. To this end, no reference to operating data delivered by other means is required, which might otherwise result in a time delay.

Appropriately, the motion control function comprises a speed control function, a position control function, or a displacement control function. By means of the latter it is possible to determine the position of a rotor of the electric machine in relation to the stator, and to the control the speed or the position thereof, such that the state of the electric machine consistently corresponds to a predetermined state. Specifically, the motion control function comprises at least two, specifically three of these individual control functions, thereby ensuring the comparatively secure operation of the electric machine. Appropriately, no hardware functions which are specifically adapted for the power element are executed within the motion control function. In other words, no knowledge of the design of the power element is necessary for the correct operation of the control element. Preferably, the speed of rotation and/or the position determined by the motion control function are transmitted to the power element, specifically to the safety control circuit.

Specifically, the power element and the control element, for signaling purposes, are interconnected by means of a bus system. For example, the bus system is EtherCat, Open SAFETY, Sercos III or any other industrial ethernet. For example, the bus system is provided and configured for the transmission of securely encapsulated telegrams. The bus system provides a standardized interface between the control element and the power element, such that a replacement of individual components is simplified. These components are only required to fulfil the specifications of the respective bus system used. The complexity of wiring required for the installation is also reduced. Specifically, a process control circuit can also be coupled to the control element, for signaling purposes, by means of the bus system, thereby permitting further modularization, and also permitting comparatively simple and time-saving installation.

The converter is preferably employed for the operation of an electric motor, such as a synchronous or an asynchronous motor. Appropriately, the converter is a component of an industrial installation. Specifically, the converter has a maximum power output ranging from 700 W to 500 kW. Appropriately, the power output is equal to or greater than 1 kW, 5 kW, 10 kW, 50 kW, 100 kW or 200 kW. For example, the power output is equal to or smaller than 400 kW, 250 kW, 100 kW, 50 kW, 15 kW or 2 kW.

Other features which are considered as characteristic for the invention are set forth in the appended claims.

Although the invention is illustrated and described herein as embodied in a converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
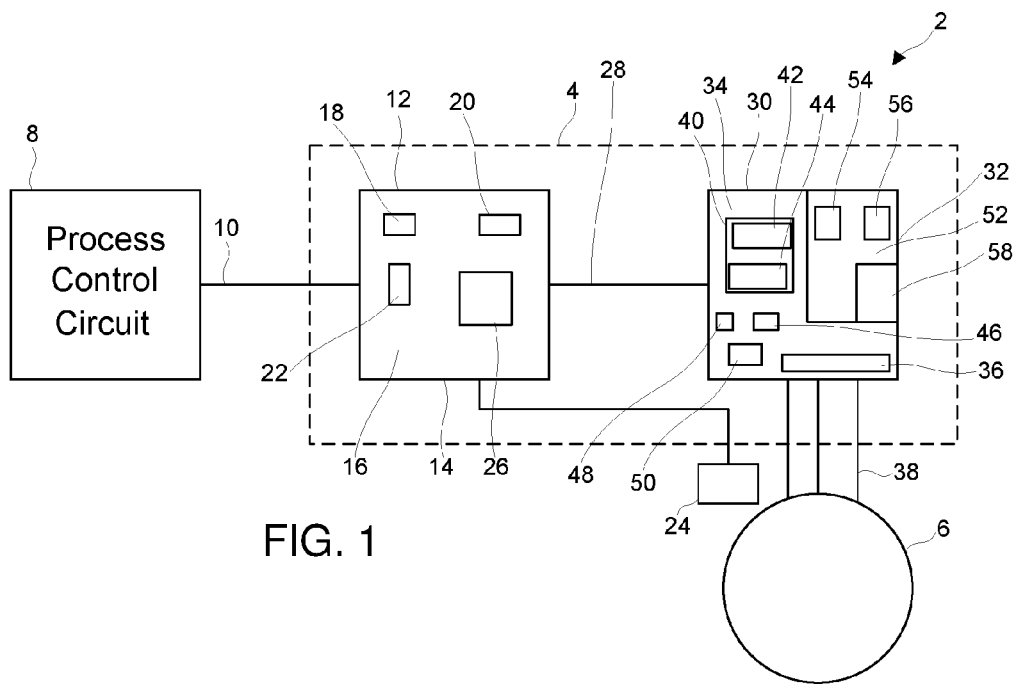
FIG. 1 shows a schematic representation of a first form of embodiment of a converter, with a control element and a power element, by way of which an electric machine is driven.

Referring now to the figures of the drawing in detail and first, particularly, to FIG. 1 thereof, there is shown an industrial installation 2 with a converter 4, by means of which an electric machine 6 is operated. The control of the electric machine 6 by the converter 4 is executed on the basis of inputs (i.e., input signals) from a process control circuit 8, which is coupled to the converter 4, for signaling purposes, by way of a first bus system 10. The input signals are transmitted to a control element 12 of the converter 4, which comprises a motion control function 16 accommodated in a first housing 14. The motion control function 16 is configured in the form of a printed circuit board, which is not represented in greater detail. The motion control function 16 comprises a speed control function 18, a position control function 20 and a displacement control function 22, by means of which the notional inputs of the process control circuit 8 are processed. These are compared with current actual values of the electric machine 6, namely a speed of rotation which is recorded by means of a rotary transducer 24 of the electric machine 6. Measured data from the rotary transducer 24 are recorded by means of an encoder evaluation function 26, and made available to the speed control function 18, the position control function 20 and the displacement control function 22. By means thereof, a setpoint speed of rotation is determined, such that the electric machine 6 is brought to a state which is dictated by the process control circuit 8.

The setpoint speed of rotation, also referred to as the notional speed of rotation, is transmitted to a power element 30 with a second housing 32 by means of a second bus system 28. The second housing 32 is arranged with a clearance to the first housing 14 and, in a form and manner which are not represented in greater detail, is connected to ground. A power circuit 34 is accommodated in the second housing 32, comprising six power semiconductor switches 36. The power semiconductor switches 36 are IGBTs with hereto parallel-connected free-wheeling diodes, and are arranged in mutual electrical contact in a bridge circuit, namely a B6 circuit. The power semiconductor switches 36 are arranged in electrical contact with an intermediate circuit, which is not represented in greater detail, to which a d.c. voltage is applied. The intermediate circuit is supplied via a rectifier side, which is likewise not represented and which, in turn, is arranged in electrical contact with a power grid of the industrial installation 2, which is likewise not represented.

In other words, an alternating current supplied by the power grid is converted by the rectifier side into a direct current for the intermediate circuit which, in turn, by means of the semiconductor switches 36, is converted into a three-phase alternating current, by means of which the electric machine 6 is operated. To this end, the power element 34 is arranged in electrical contact with the electric machine 6 by means of a three-phase conductor 38. Control signals are supplied to the semiconductor switches 36 by a pulse-width modulator 40, by means of which the respective power semiconductor switches 36 are switched to an electrically conducting or an electrically non-conducting state. The pulse-width modulator comprises both a current control function 42 and a driver circuit 44. By means of the current control function 42, a notional electric current corresponding to the setpoint speed of rotation of rotation dictated by the control element 12 is determined, from which the driver circuit 44 generates corresponding control signals for the power semiconductor switches 36.

The power circuit 34 also comprises an electric voltage recording function 46 and an electric current recording function 48, by means of which the electric voltage supplied by the semiconductor switches 36 or the electric current 42 are determined. These operating data are made available to the current control function 42, and on the basis thereof the driver circuit 44, in order to reduce the differential between the actual electric current determined by the electric current recording function 48 and the notional electric current determined from the stipulated setpoint speed of rotation of rotation, is actuated. The power circuit 34 also comprises a temperature recording function 50, by means of which the temperature of the power semiconductor switches 36, a specified operating temperature range, is monitored.

The power element 30 also comprises a safety control circuit 52 with a first safety function 54 and a second safety function 56. The first safety function 54 is a safe limited speed function, which ensures that a maximum speed of rotation of the electric machine 6 is not exceeded. To this end, operating data recorded by the encoder evaluation function 26 and the setpoint speed of rotation communicated via the second bus system 28 are compared with the maximum permissible speed of rotation. Upon the activation of the first safety function 54 and an overrun of the maximum speed of rotation, either by the recorded speed of rotation or the stipulated speed of rotation, the pulse-width modulator 40 is actuated by means of the safety control circuit 52, and influences either the driver circuit 44 directly or the current control function 42 such that the speed of rotation of the electric machine 6 is maintained below the maximum speed of rotation. To this end, for example, the signals generated by the driver circuit 44 may be abbreviated in time or blocked for a specific time interval, i.e. resulting in a signal drop-out such that, during said time interval, the semiconductor switches 36 are maintained in an electrically non-conducting state.

The second safety function 56 is a safe stop function of the electric machine 6. Upon the activation of the second safety function 56, all signals generated by the driver circuit 54 are canceled, resulting in the essentially instantaneous switching of the semiconductor switches 36 to an electrically non-conducting state. If the electric machine 6 is still in motion upon the activation of the second safety function 56, it will coast, with consequently no generation of torque.

The safety control circuit 52 also comprises a diagnostic function 58, by means of which, upon the start-up of the industrial installation 2, i.e. upon the infeed of current to the converter 4 and the switchover of the converter 4 to a standby or operating mode, the correct operation of the first and second safety functions 54, 56, of the pulse-width modulator 40, of the electric voltage recording function 46 and of the electric current recording function 48 are verified. If, for example, the electric current recording function 48 is defective, and a value deviating from 0 amps is recorded, notwithstanding the non-activation of the power semiconductor switches 36 and the consequent absence of signals generated by the pulse-width modulator 40, the second safety function 56 is activated forthwith, and an error message is generated. This is signaled, for example, by means of an indicator, such as a light, and is transmitted to the process control circuit 8 via the first and second bus systems 10, 28.

The converter 4 is of modular design, thereby permitting a replacement of both the control element 12 and the power element 30, with no resulting requirement for the special adaptation of the remaining element. Only the bus connection 28 needs to be separated for the purposes of replacement, then restored once the replacement is complete. It is also possible for the safety control circuit 52 to be replaced by a different safety control circuit 52 which has a different number of safety functions. A safety control circuit 52, not represented here, comprises a safety function which brings the electric machine 6 to a controlled stop. In other words, the safety function is a safe stop function. Each of the replacement safety control circuits 52 is specifically provided with the second safety function 56, namely, the safe stop function. For example, after installation, the safety control circuit 52 is set and parameterized by means of the process control circuit 8 via the two bus systems 10, 28, or by means of the power circuit 34.

Figure 2:
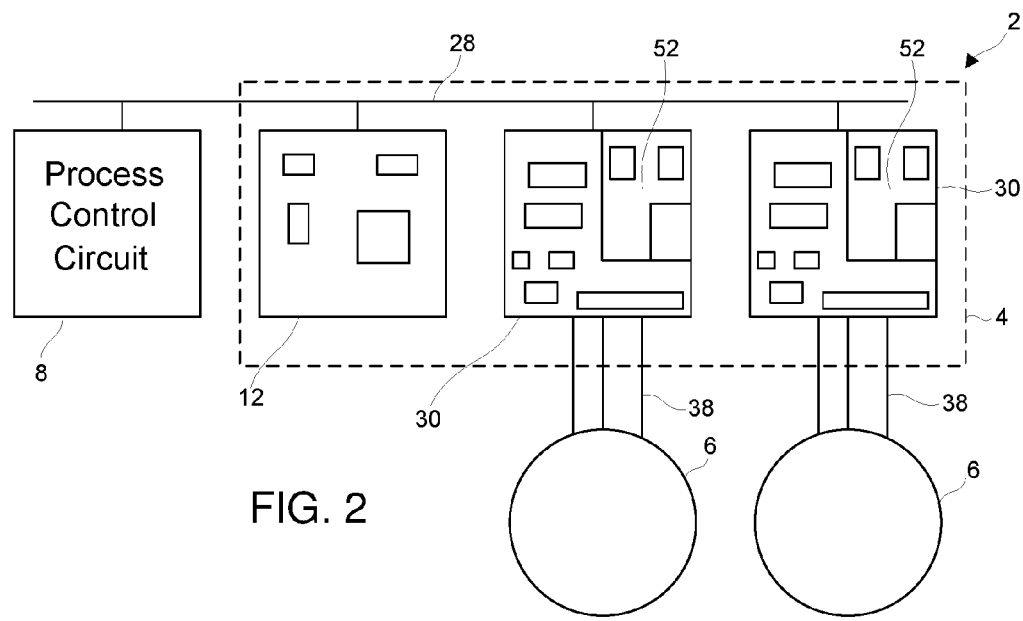
FIG. 2 shows a further exemplary embodiment of the converter, with two power elements.

FIG. 2 represents a further form of embodiment of the converter 4. The converter 4 comprises two power elements 30, each of which is associated with an electric machine 6. The configuration of the conductors 38, the electric machines 6 and the power elements 30 corresponds to the embodiment represented in the previous form of embodiment, although the associated rotary transducer 24 is not represented. The control element 12 also corresponds to the control element represented in FIG. 1. In other words, the converter 4 represented in FIG. 1 and the industrial installation 2 are expanded by the addition of a further power element 30 and a further electric machine 6 respectively. The second bus system 28 has been modified, in that both power elements 30 are now connected to the control element 12, for signaling purposes, by means of the second bus system 28. The first bus system 10 is omitted, and the process control circuit 8 is also coupled to the second bus system 28. The respective safety control circuits 52 of the two power elements 30, upon installation, are parameterized by means of the second bus system 28, and the respective safety functions 54, 56 are activated by means of the second bus system 28. The process control circuit 8 feeds appropriate signals for this purpose to the second bus system 28.

Figure 3:
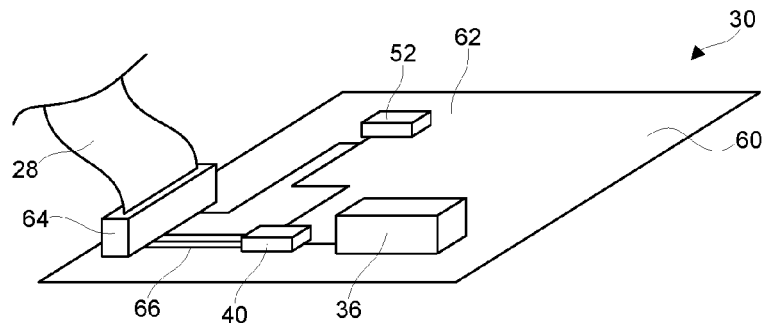
FIG. 3 shows a first exemplary embodiment of the power element, as a first printed circuit board.

FIG. 3 represents a form of embodiment of the power element 30, wherein the second housing 32 is omitted. The power element 30 comprises a first printed circuit board 60 with a first board 62, to which the power semiconductor switches 36 are soldered, only one of which is represented here. The pulse-width modulator 40 and a connector 64, which provides the connection to the second bus system 28, are also soldered to the first printed board 62. The connector 64, the pulse-width modulator 40 and the semiconductor switches 36 are arranged in mutual electrical contact by means of printed conductors 66. The first printed circuit board 60 also comprises the safety control circuit 52 in the form of an integrated circuit, which is also arranged in electrical contact with the connector 64 and the pulse-width modulator 40 by means of the printed conductors 66.

Figure 4:
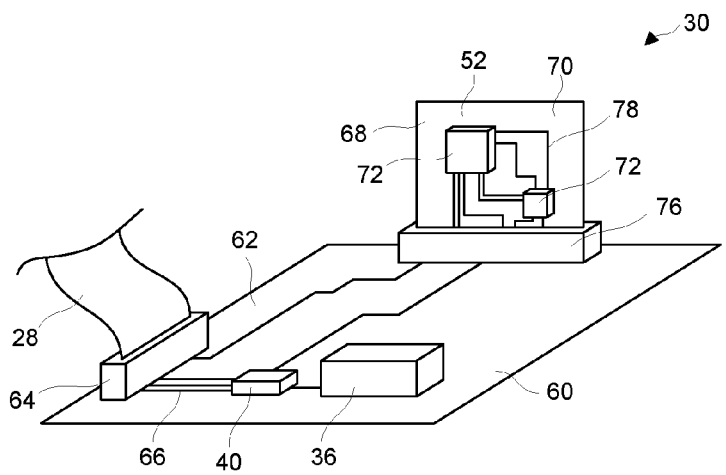
FIG. 4 shows a second exemplary embodiment of the power element with a second printed circuit board.

FIG. 4 represents a further form of embodiment of the power element 30 with the first printed circuit board 60. With the exception of the safety control circuit 52, the configuration of the first printed circuit board 60 corresponds to the variant represented in FIG. 3. In other words, the integrated circuit constituting the safety control circuit 52 is omitted. The safety control circuit 52 comprises a second printed circuit board 68 with a second printed board 70, to which a number of electric and/or electronic components 72 are soldered, arranged in contact by means of printed conductors 74. Said components 72 include a programmable microprocessor. The second printed circuit board 68 is configured in the form of an interchangeable printed board, and is connected to a plug-in connector 76 of the first printed circuit board 60 which, by means of the printed conductors 66 of the first printed board 62, is arranged in electrical contact with both the connector 74 and the pulse-width modulator 40. A configuration of the power element 30 of this type permits a comparatively simple and rapid replacement of the safety control circuit 52.

Figure 5:
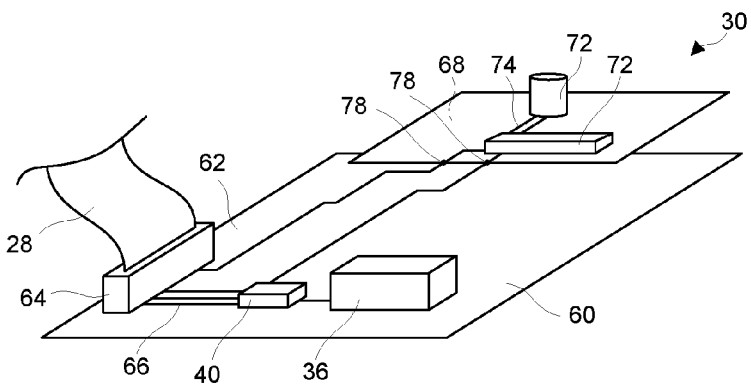
FIG. 5 is a similar view of a third exemplary embodiment. In all the figures, corresponding components are marked by the same reference numbers.

FIG. 5 represents a further configuration of the power element 30, with the first printed circuit board 60 and the second printed circuit board 68. With the exception of the plug-in connector 76, the first printed circuit board corresponds to the form of embodiment represented in FIG. 4. The safety control circuit 52 represented in FIG. 5 executes only the second safety function 56. Likewise, the diagnostic function 58 is not included. The second printed circuit board 68 incorporates no integrated circuit, but only discrete electrical components 72, which are arranged in mutual electrical contact by means of the printed conductors 74. Accordingly, the second printed circuit board is configured with an entirely discrete arrangement, and is attached to the first printed circuit board 60 by means of soldered connections 78. The soldered connections 78 are provided for the purposes of mechanical attachment, and also for the mutual electrical contact of the two printed circuit boards 60, 68.

The invention is not restricted to the examples of embodiment described above. On the contrary, further variants of the invention might be deduced therefrom by a specialist, without departing from the subject of the invention. Specifically, moreover, all the individual characteristics described with reference to the individual examples of embodiment might be combined in a different manner, without departing from the subject of the invention.

The following is a summary list of reference numerals and the corresponding structure used in the above description of the invention:

2 Industrial installation
4 Converter
6 Electric machine
8 Process control circuit
10 First bus system
12 Control element
14 First housing
16 Motion control function
18 Speed control function
20 Position control function
22 Displacement control function
24 Rotary transducer
26 Encoder evaluation function
28 Second bus system
30 Power element
32 Second housing
34 Power circuit
36 Power semiconductor switch
38 Conductor
40 Pulse width modulator
42 Current control function
44 Driver circuit
46 Electric voltage recording function
48 Electric current recording function
50 Temperature recording function
52 Safety control circuit
54 First safety function
56 Second safety function
58 Diagnostic function
60 First printed circuit board
62 First printed board
64 Connector
66 Printed conductor
68 Second printed circuit board
70 Second printed board
72 Electric/electronic components
74 Printed conductor
76 Plug-in connector
78 Soldered connection

The invention claimed is:

1. A converter to be connected to an electric machine, comprising:
   a control element having a motion control function;
   a power element having a power semiconductor switch; and
   said power element having a safety control circuit configured to provide a safety function, the safety function causing the power semiconductor switch to be driven, or a circuit of said semiconductor switch to be driven, so as to transfer the electric machine into a safe condition.

2. The converter according to claim 1, wherein said power element is a first printed circuit board that carries said power semiconductor switch.

3. The converter according to claim 2, wherein said first printed circuit board carries said safety control circuit.

4. The converter according to claim 2, wherein said safety control circuit is provided with a second printed circuit board that is attached to said first printed circuit board.

5. The converter according to claim 4, wherein said second printed circuit board is attached to said first printed circuit board by a plug-in arrangement or by soldering.

6. The converter according to claim 1, wherein said safety function is a safe limited speed function or a safe torque off function.

7. The converter according to claim 1, wherein said safety control circuit is configured to provide a diagnostic function.

8. The converter according to claim 1, wherein said power element is provided with a current control function and/or a driver circuit by way of which the power semiconductor switch is controlled.

9. The converter according to claim 1, wherein said power element comprises a pulse-width modulator for driving said power semiconductor switch.

10. The converter according to claim 1, wherein said power element comprises one or more of the following: an electric voltage recording function, a temperature recording function, or an electric current recording function.

11. The converter according to claim 1, wherein said motion control function comprises one or more of the following: an encoder evaluation function, a speed control function, a position control function, or a displacement control function.

12. The converter according to claim 1, which comprises a bus system connecting said power element and said control element for signaling purposes.

13. A converter to be connected to an electric machine, the converter comprising:
   a control element having a motion control function;
   a power element having a power semiconductor switch; and
   said power element having a safety control circuit configured to provide a safety function selected from the group of safety functions consisting of a safe limited speed function, a safe torque off function, a safe operating stop function and a safe stop function.

* * * * *